(12) United States Patent
Read et al.

(10) Patent No.: US 10,024,568 B1
(45) Date of Patent: Jul. 17, 2018

(54) LOCK BOX FOR A BUILDING CONTROLLER

(71) Applicant: Honeywell International Inc., Morris Plains, NJ (US)

(72) Inventors: Travis Read, Little Canada, MN (US); Brian Moy, Arden Hills, MN (US); David Emmons, Plymouth, MN (US); Tarik Khoury, Brno (CZ); Arnold Kalla, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/704,520

(22) Filed: Sep. 14, 2017

(51) Int. Cl.
| | |
|---|---|
| H01R 13/46 | (2006.01) |
| F24F 11/89 | (2018.01) |
| F24F 11/02 | (2006.01) |
| F24F 11/00 | (2018.01) |
| E05B 65/00 | (2006.01) |
| F24F 11/30 | (2018.01) |
| H02G 3/10 | (2006.01) |

(52) U.S. Cl.
CPC ............ *F24F 11/89* (2018.01); *E05B 65/006* (2013.01); *F24F 11/0012* (2013.01); *F24F 11/02* (2013.01); *F24F 11/30* (2018.01); *H02G 3/10* (2013.01)

(58) Field of Classification Search
CPC .................................................. H01R 13/748
USPC ....................................................... 174/520
See application file for complete search history.

(56) References Cited

U.S. PATENT DOCUMENTS

| | | | |
|---|---|---|---|
| 333,792 | A | 1/1886 | Tixier |
| 350,009 | A | 9/1886 | Matteson |
| 3,051,001 | A | 8/1962 | Laviana et al. |
| 3,096,935 | A | 7/1963 | Gibson |
| 3,152,851 | A | 10/1964 | McLaughlin |
| 3,310,646 | A | 3/1967 | Edwards |
| 3,999,732 | A | 12/1976 | Stephens |

(Continued)

FOREIGN PATENT DOCUMENTS

| | | | |
|---|---|---|---|
| CA | 658329 | A | 2/1963 |
| CA | 772736 | A | 11/1967 |

(Continued)

OTHER PUBLICATIONS

International Search Report for PCT Application Serial No. PCT/US2015/054208, dated Mar. 12, 2015.

(Continued)

*Primary Examiner* — Sherman Ng
(74) *Attorney, Agent, or Firm* — Seager Tufte & Wickhem LLP (57) ABSTRACT

Lock boxes may be used to protect a building controller from tampering. In some cases, a lock box may include a back plate that is configured to be mounted to a wall or a junction box and a front cover that may be secured to the back plate and locked in place. In some cases, the back plate may be configured to help secure a building controller thereto. In some cases, the back plate may be configured to secure a wall mountable connector to which the building controller may be secured. In some instances, the back plate may include mounting features that can engage corresponding mounting features of the wall mountable connector in order to secure the wall mountable connector to the back plate of the lock box.

20 Claims, 11 Drawing Sheets

(56) References Cited

U.S. PATENT DOCUMENTS

| | | | |
|---|---|---|---|
| D249,476 S | 9/1978 | Kolbow | |
| 4,119,936 A | 10/1978 | Laviana et al. | |
| 4,150,718 A | 4/1979 | Kolbow et al. | |
| 4,295,180 A * | 10/1981 | Herron | H05K 5/0017 236/94 |
| 4,421,271 A | 12/1983 | Shavit | |
| 4,431,134 A | 2/1984 | Hendricks et al. | |
| 4,587,403 A | 5/1986 | Shapess | |
| 4,669,654 A | 6/1987 | Levine et al. | |
| 4,998,085 A | 3/1991 | Johnson | |
| 5,024,265 A | 6/1991 | Buchholz et al. | |
| 5,107,918 A | 4/1992 | McFarlane et al. | |
| 5,317,670 A | 5/1994 | Elia | |
| 5,485,954 A | 1/1996 | Guy et al. | |
| 5,729,442 A | 3/1998 | Frantz | |
| D402,569 S | 12/1998 | Papic et al. | |
| 6,102,749 A | 8/2000 | Lynn et al. | |
| 6,169,337 B1 | 1/2001 | Yoshida et al. | |
| 6,347,747 B1 | 2/2002 | Nesbitt | |
| 6,362,953 B1 | 3/2002 | Ohlwine et al. | |
| 6,888,441 B2 | 5/2005 | Carey | |
| 7,140,551 B2 | 11/2006 | De Pauw et al. | |
| D533,793 S | 12/2006 | Moore | |
| 7,159,789 B2 | 1/2007 | Schwendinger et al. | |
| 7,161,483 B2 | 1/2007 | Chung | |
| 7,222,800 B2 | 5/2007 | Wruck | |
| 7,271,338 B1 | 9/2007 | Rohmer | |
| 7,344,422 B2 | 3/2008 | Helmreich | |
| 7,360,376 B2 | 4/2008 | Juntunen et al. | |
| D568,719 S | 5/2008 | Gorin et al. | |
| 7,569,777 B1 | 8/2009 | Gillam | |
| 7,617,988 B2 | 11/2009 | Morrow et al. | |
| 7,633,743 B2 | 12/2009 | Barton et al. | |
| 7,726,581 B2 | 6/2010 | Naujok et al. | |
| 7,832,652 B2 | 11/2010 | Barton et al. | |
| 7,904,608 B2 | 3/2011 | Price | |
| 7,938,336 B2 | 5/2011 | Rhodes et al. | |
| 8,089,032 B2 * | 1/2012 | Beland | G05D 23/1902 219/492 |
| 8,262,422 B1 | 9/2012 | Chiang | |
| 8,364,319 B2 | 1/2013 | Roosli | |
| 8,511,576 B2 | 8/2013 | Warren et al. | |
| 8,511,577 B2 | 8/2013 | Warren et al. | |
| 8,708,242 B2 | 4/2014 | Conner et al. | |
| 8,727,611 B2 | 5/2014 | Huppi et al. | |
| 8,752,771 B2 | 6/2014 | Warren et al. | |
| 8,802,981 B2 | 8/2014 | Wallaert et al. | |
| 9,026,232 B2 | 5/2015 | Fadell et al. | |
| 9,046,414 B2 | 6/2015 | Fadell et al. | |
| 9,092,039 B2 | 7/2015 | Fadell et al. | |
| 9,247,378 B2 | 1/2016 | Bisson et al. | |
| D751,426 S | 3/2016 | Edgar | |
| 9,282,654 B2 | 3/2016 | Bick et al. | |
| 9,419,361 B2 | 8/2016 | Daily et al. | |
| 9,423,805 B2 | 8/2016 | Novotny et al. | |
| 9,494,332 B2 | 11/2016 | Filson et al. | |
| 9,667,009 B1 | 5/2017 | Read et al. | |
| 9,686,880 B1 | 6/2017 | Khoury et al. | |
| D794,478 S | 8/2017 | Read et al. | |
| 9,735,482 B1 | 8/2017 | Read et al. | |
| 9,735,518 B1 | 8/2017 | Read et al. | |
| 9,748,708 B2 | 8/2017 | Mostoller et al. | |
| 9,768,564 B2 | 9/2017 | Read et al. | |
| 9,774,158 B2 | 9/2017 | Barton et al. | |
| 9,780,511 B2 | 10/2017 | Janovec et al. | |
| 2005/0114234 A1 | 5/2005 | Thomas et al. | |
| 2005/0194457 A1 | 9/2005 | Dolan | |
| 2006/0192022 A1 | 8/2006 | Barton et al. | |
| 2010/0084482 A1 | 4/2010 | Kennedy et al. | |
| 2014/0062659 A1 | 3/2014 | Roosli et al. | |
| 2014/0190679 A1 | 7/2014 | Roosli et al. | |
| 2014/0226286 A1 | 8/2014 | Novotny et al. | |
| 2014/0268452 A1 | 9/2014 | Khoury et al. | |
| 2014/0268470 A1 | 9/2014 | Sapak et al. | |
| 2014/0319236 A1 | 10/2014 | Novotny et al. | |
| 2014/0321092 A1 | 10/2014 | Novotny et al. | |
| 2015/0096352 A1 | 4/2015 | Peterson et al. | |
| 2015/0144705 A1 | 5/2015 | Thiruvengada et al. | |
| 2015/0159903 A1 | 6/2015 | Marak et al. | |
| 2015/0327375 A1 | 11/2015 | Bick et al. | |
| 2016/0020590 A1 | 1/2016 | Roosli et al. | |
| 2016/0104981 A1 | 4/2016 | Mostoller et al. | |
| 2017/0134214 A1 | 5/2017 | Sethuraman et al. | |
| 2017/0234560 A1 | 8/2017 | Novotny et al. | |
| 2017/0234565 A1 | 8/2017 | Emmons et al. | |
| 2017/0234568 A1 | 8/2017 | Read et al. | |
| 2017/0234569 A1 | 8/2017 | Emmons et al. | |
| 2017/0236766 A1 | 8/2017 | Read et al. | |
| 2017/0237246 A1 | 8/2017 | Janovec et al. | |

FOREIGN PATENT DOCUMENTS

| | | |
|---|---|---|
| CA | 1249869 A | 2/1989 |
| CA | 2062076 C | 5/2000 |
| CN | 101180608 A | 5/2008 |
| DE | 102012005465 B3 | 5/2013 |
| DE | 202013101582 U1 | 8/2014 |
| EP | 0976957 A2 | 2/2000 |
| EP | 1622224 A1 | 2/2006 |
| FR | 2935201 A1 | 2/2010 |

OTHER PUBLICATIONS

Enviromental Technologies, Inc., "Enviro-Tec ETST4H 2" Square Thermostat Mounting Instructions," 1 pages, downloaded Feb. 21, 2016.
Honeywell, "FocusPro 6000 Series Programmable Digital Thermostat, Installation Instructions," 24 pages, Mar. 2014.
Honeywell, "Heating/Cooling Thermostat and Subbase or Heating or Cooling Thermostat and Wallplate, T8195A,B/Q682 Owner's Manual," 24 pages, Dec. 1994.
Honeywell, "Lyric Installation Guide," 9 pages, downloaded Feb. 20, 2016.
Honeywell, "TB6575/TB8575 SuitePRO Digital Fan Coil Thermostats, Installation Instructions," 20 pages, Oct. 2013.
https://nest.com/support/pro/article/Help-with-Installation-and-set-up, "Nest Learning Thermostat Advanced Installation and Setup Help for Professional Installers," 22 pages, printed Feb. 20, 2016.
https://www.google.com/search?q=nest+sub+base&espv=2&biw=1032&bih=946&source=lnms&tbm=isch&sa=X&ved=0ahUKEwiNmea73YbLAhWjdR4KH . . . , "Thermostat Subbase—Google Search," 28 pages, printed Feb. 20, 2016.
https://www.google.com/search?q=nest+sub+base&espv=2&biw=1032&bih=946&source=lnms&tbm=isch&sa=X&ved=0ahUKEwiNmea73YbLAhWJdR4KH . . . , "Thermostat Wall Plate—Google Search," 16 pages, printed Feb. 20, 2016.
ICM Controls, "SC700V Non-Programmable Fan Coil Thermostat," 2 pages, downloaded Feb. 21, 2016.
Infineon, "TPM Key Backup and Recovery for Trusted Platforms," pp. 1-17, Sep. 21, 2006.
Lux, "WP567 LUX Universal Wallplate—Fits Thermostats TX500U, TX9100U, TX9600TS," available on Amazon.com, downloaded May 20, 2015.
Pro, "Heavy Duty Products for HVAC Professionals," 2 pages, downloaded Feb. 8, 2016.
Ritetemp, "Install Guide 6004," 7 pages, downloaded Feb. 21, 2016.
White-Rodgers, "F61-2XXX Adaptor Plate Assembly, Installation Instructions," 2 pages, downloaded Feb. 21, 2016.
Honeywell, "Universal Thermostat Guards, Installation Guide," Installation Instructions, 1 page, downloaded Jan. 9, 2017.
https://www.google.com/search?q=thermostat+guard&biw=1252&bih=1 . . . , "Thermostat Guard, Google Search," 14 pages, printed Nov. 11, 2016.

\* cited by examiner

LOCK BOX FOR A BUILDING CONTROLLER

TECHNICAL FIELD

The present disclosure pertains generally to building systems such as Heating, Ventilation, and/or Air Conditioning (HVAC) systems. More particularly, the present disclosure pertains to building controllers, such as HVAC controllers, and devices for mounting building controllers to a wall and protecting the building controller against undesired access.

BACKGROUND

Building automation systems are often used to control building systems such as Heating, Ventilation, and/or Air Conditioning (HVAC) systems, security systems, lighting systems, and the like. In many cases, a device (e.g. controller) with a user interface is mounted on a wall of the building that allows a user to monitor and/or control one or more of the building systems. In some cases, the device is placed inside of a lock box. The lock box may help prevent unauthorized access to the user interface of the device. What would be desirable is an improved lock box that includes features that help mount the device in the lock box in a simple and efficient manner.

SUMMARY

The present disclosure pertains generally to lock boxes that may be used to protect a building controller from tampering. In some cases, a lock box may include a back plate that is configured to be mounted to a wall or a junction box, and a front cover that may be secured to the back plate and locked in place. In some cases, the back plate may be configured to secure a building controller thereto. In some cases, the back plate may be configured to secure a wall mountable connector to which the building controller may be secured. In some instances, the back plate may include mounting features that can engage corresponding mounting features of the wall mountable connector in order to help secure the wall mountable connector to the back plate of the lock box.

In an example of the disclosure, a lock box for protecting a building controller from tampering includes a back plate and a front cover that is hingedly coupled to the back plate. The back plate defines one or more mounting features that are configured to permit a wall mountable connector to be secured to the back plate by pressing the wall mountable connector against the back plate such that the one or more mounting features of the back plate engage corresponding mounting features of the wall mountable connector. The wall mountable connector may be configured to releasably secure a building controller to the wall mountable connector, and thus to the back plate, and to provide electrical connections between the building controller and building control equipment that is to be controlled by the building controller.

The back plate may include a plurality of mounting apertures that are defined by the back plate and that are configured to receive a securement for securing the back plate to a wall. The front cover is movable between an open position in which a user may access the building controller when the building controller and the wall mountable connector are secured relative to the back plate, and a closed position in which the user is prevented from accessing the building controller when the building controller and the wall mountable connector are secured relative to the back plate. The lock box may include a lock that is configured to selectively lock the front cover in the closed position.

In another example of the disclosure, a lock box for protecting a thermostat includes a back plate and a field wire aperture that is defined within and extending through the back plate. The lock box may include one or more latching features for latching a wall mountable connector to the back plate, wherein the wall mountable connector is configured to releasably secure a thermostat to the wall mountable connector. A front cover is operatively coupled to the back plate and is movable between an open position in which a user may access the thermostat when the wall mountable connector and the thermostat are secured relative to the back plate, and a closed position in which the user is prevented from accessing the thermostat when the wall mountable connector and the thermostat are secured relative to the back plate.

In another example of the disclosure, a lock box for protecting a thermostat includes a back plate and a field wire aperture that is defined within and extending through the back plate. The back plate defines an interference connector for forming an interference connection with a wall mountable connector that is configured to releasably secure a thermostat to the wall mountable connector. A front cover is operatively coupled to the back plate and is movable between an open position in which a user may access the thermostat when the wall mountable connector and the thermostat are secured relative to back plate, and a closed position in which the user is prevented from accessing the thermostat when the wall mountable connector and the thermostat are secured relative to the back plate.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems, and may include a variety of different building controllers. For example, a security system may include one or more security controllers. An HVAC system may include one or more HVAC controllers, and so on. While HVAC controllers are used as an example below, it should be recognized that the concepts disclosed herein can be applied to building automation systems and building controllers more generally.

Figure 1:
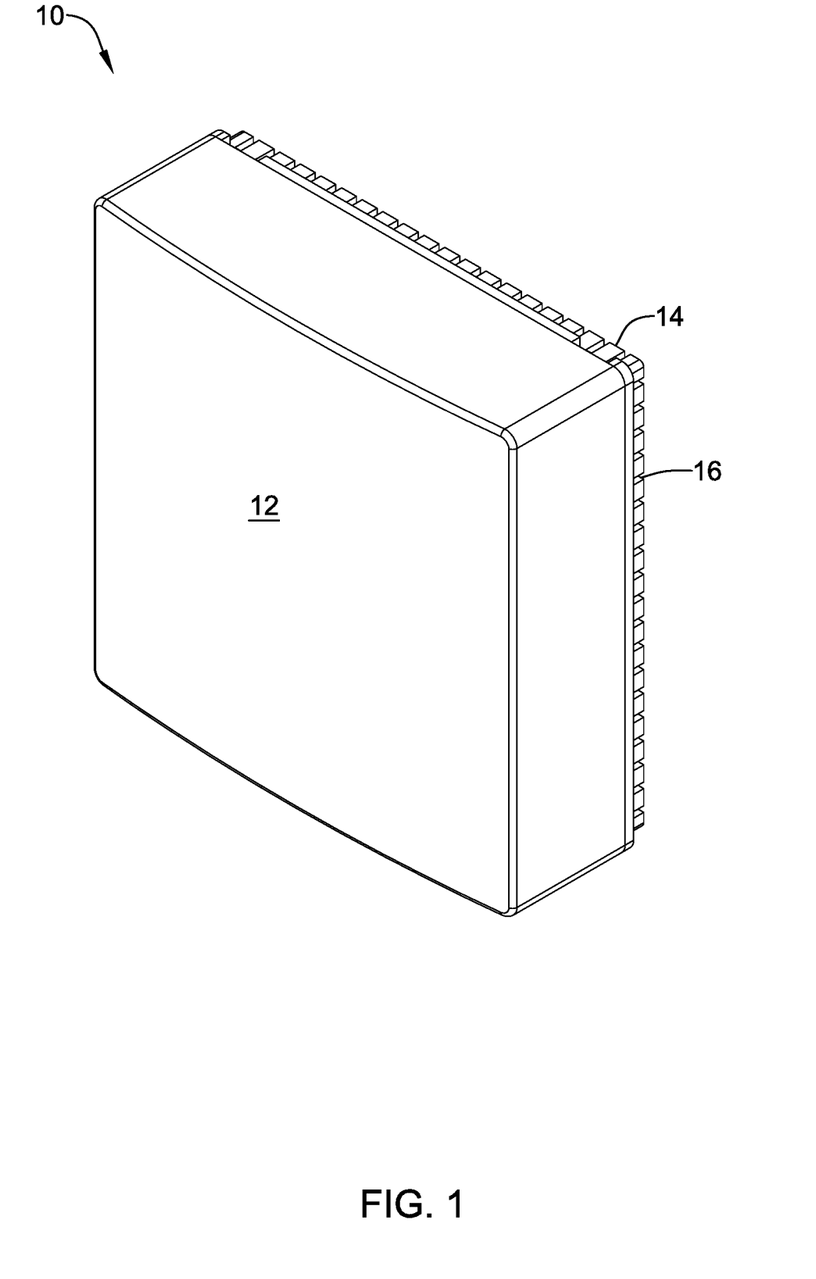
FIG. 1 is a perspective view of an illustrative lock box for protecting a building controller against tampering in accordance with an example of the disclosure.

In some cases, there may be a desire to protect a building controller against tampering. For example, in an HVAC system, there may be a desire to prevent non-authorized persons from accidentally or intentionally changing temperature set points or other HVAC parameters. Similar concerns may exist with building controllers for security systems, lighting systems, fire suppression systems, energy management systems and the like. FIG. 1 is a perspective view of a lock box 10 that may be used, for example, to protect a building controller against tampering. The lock box 10 may be dimensioned to accommodate any of a variety of different building controllers, for example, and may be configured to be secured to a wall or other vertical mounting surface. The lock box 10 includes a front cover 12 and a back plate 14. In some cases, the front cover 12 may be transparent or at least translucent so that a user may be able to read information displayed on a building controller disposed within the lock box 10. In some cases, as shown, the back plate 14 may provide ventilation into an interior of the lock box 10, as partially seen in a plurality of venting apertures 16.

Figure 2:
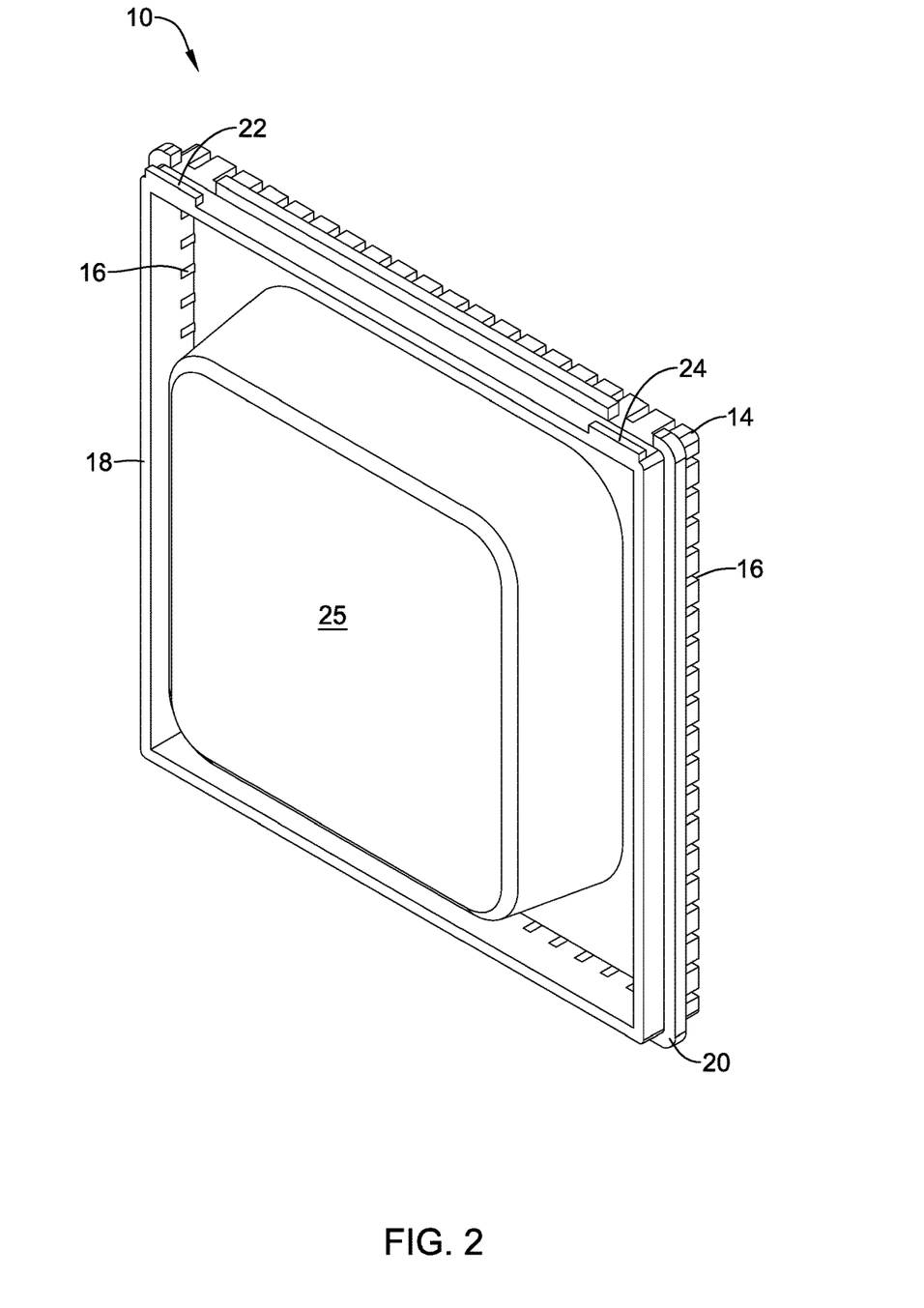
FIG. 2 is a perspective view of the illustrative lock box of FIG. 1, with a front cover removed to show the building controller in accordance with an example of the disclosure.

In FIG. 2, the front cover 12 of FIG. 1 has been removed. In some cases, as shown, the back plate 14 includes a side wall 18 that extends around a periphery of the back plate 14. The aforementioned venting apertures 16, when provided, are shown extending through the side wall 18. In some instances, the side wall 18 defines a front cover engaging surface 20 that the front cover 12 can rest against when the front cover 12 is positioned relative to the back plate 14 as shown for example in FIG. 1. In the example shown, the side wall 18 also defines a pair of tabs 22, 24 that extend vertically upward (in the illustrated orientation) from the side wall 18 and are configured to engage corresponding slots formed in an upper surface of the front cover 12 (as will be discussed subsequently). In some cases, instead of the pair of tabs 22, 24, there may instead be a single tab extending across a substantial portion of an upper portion of the side wall 18, or more than two tabs. In some cases, the side wall 18 may instead define one or more slots configured to engage one or more corresponding tabs formed in an upper surface of the front cover. While tabs and slots are uses in this example, any sort of structure that creates a hinge or other mount between the back plate 14 and the front cover 12 is contemplated.

It will be appreciated that the pair of tabs 22, 24 and corresponding slots in the front cover 12 provide a hinged connection between the front cover 12 and the back plate 14. Once rotated a particular distance, the front cover 12 may then be lifted off of the back plate 14. In some cases, this may provide installation advantages when installing the back plate 14, or when installing a building controller 25 within the lock box 10. In some instances, being able to completely remove the front cover 12 may be beneficial when, for example, programming or otherwise interacting with the building controller 25 for an extended duration without having to hold the front cover 12 in a rotated position. While not shown in FIG. 2, in some cases the front cover 12 may be hinged at the bottom and may rotated in a downward direction, may be hinged on the left side and rotate in a leftward direction, or may be hinged on the right side and rotate in a rightward direction (in the illustrated orientation).

Figure 3:
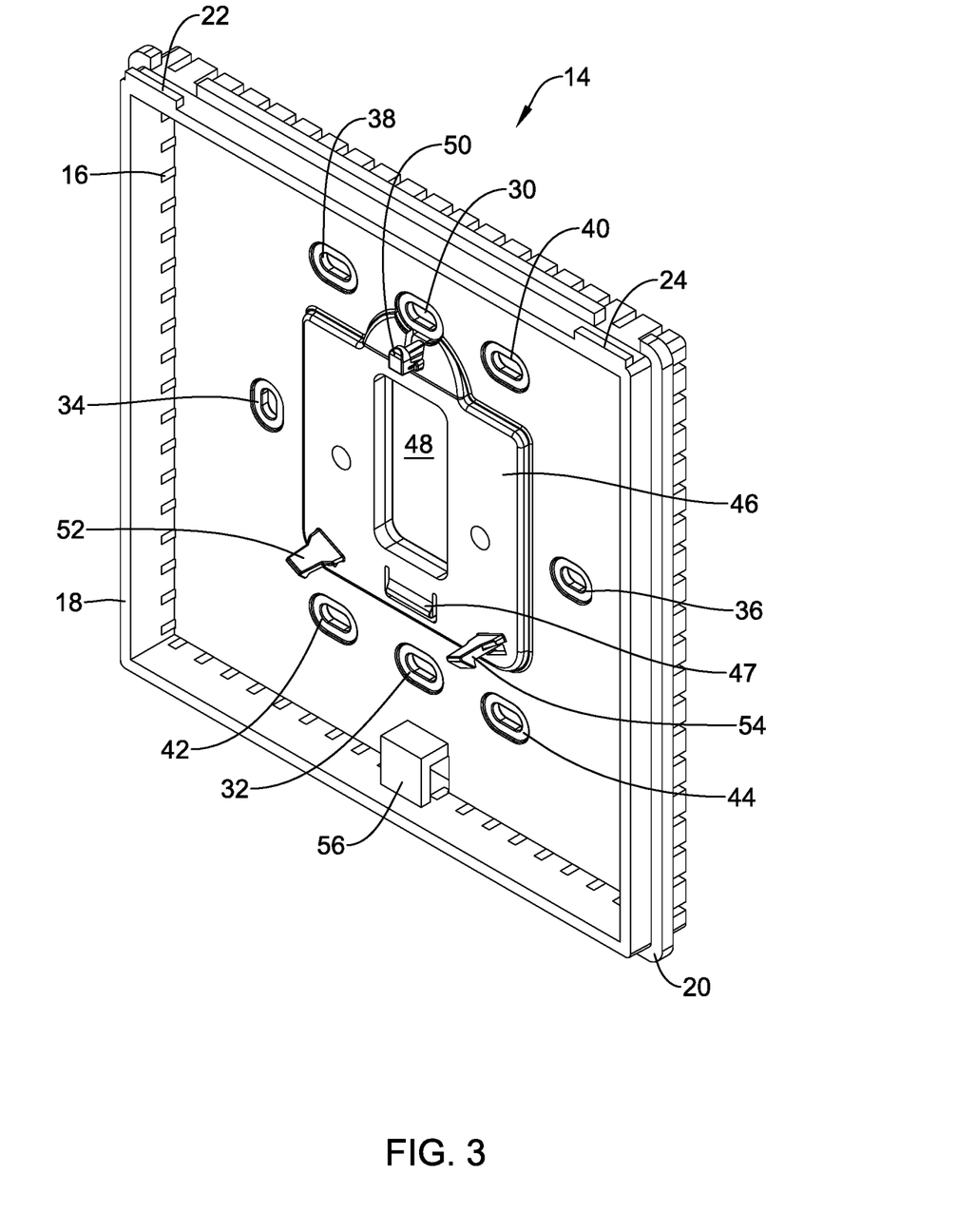
FIG. 3 is a perspective view of the illustrative lock box of FIG. 1, with the front cover and building controller removed to show a back plate forming part of the illustrative lock box in accordance with an example of the disclosure.

In FIG. 3, the building controller 25 has been removed in order to illustrate further details of the back plate 14. It can be seen that the venting apertures 16 extend around a periphery of the back plate 14. The back plate 14 may be configured to be secured to a variety of different junction box configurations by selectively using particular mounting apertures. For example, mounting apertures 30 and 32 may be used to secure the back plate 14 to a single-wide junction box that is situated in a vertical orientation. For securing the back plate 14 to a single-wide junction box that is situated in a horizontal orientation (perhaps less likely than the vertical orientation), mounting apertures 34 and 36 may be used. For securing the back plate 14 to a double-wide (or square) junction box, mounting apertures 38, 40, 42 and 44 may be used. Two or more of these apertures may be used to secure the back plate 14 directly to a wall (with no junction box). By providing various mounting apertures, a single back plate 14 may be used in a variety of different installations in order to secure the lock box 10 to the wall or other vertical surface.

In some cases, the back plate 14 includes a raised portion 46 that has a shape that corresponds to an outer profile of a wall mountable connector (shown in subsequent Figures). In some cases, a field wire aperture 48 may extend through the raised portion 46 and may enable field wires extending from a junction box (not illustrated) or just from a wall to pass through the field wire aperture 48 for connection to, for example, field wire terminals of a wall mountable connector (shown in subsequent Figures) or the like.

In some cases, the raised portion 46 includes an upper mounting latch 50, a first lower mounting latch 52 and a second lower mounting latch 54. As will be illustrated for example with respect to FIGS. 8 and 9, the mounting latches 50, 52, 54 may be positioned and configured to engage corresponding mounting features on a wall mountable connector. In some cases, the mounting latches 50, 52, 54 may be configured to permit the wall mountable connector to simply be pressed into position overlaying the raised portion 46 and snapped into position. In some cases, the raised portion 46 may include a raised element 47 that helps bias the wall mountable connector somewhat away from the raised portion 46 and into a snug fitment with the mounting latches 50, 52, 54.

In some cases, the first lower mounting latch 52 may be considered as being located lower than the upper mounting latch 50, and offset to the left of the upper mounting latch 50. In some cases, the first lower mounting latch 52 may be considered as being offset horizontally to the left of the field wire aperture 48 a distance of no more than 1.5 inches. In some cases, the second lower mounting latch 54 may be considered as being located lower than the upper mounting latch 50, and offset to the right of the upper mounting latch 50. In some cases, the second lower mounting latch 54 may be considered as being offset horizontally to the right of the field wire aperture 48 a distance of no more than 1.5 inches. In some cases, the first lower mounting latch 52 and the second lower mounting latch 54 may be vertically offset the same distance from the upper mounting latch 50. The wall mountable connector may be considered as including three mounting features that are positioned to engage the upper mounting latch 50, the first lower mounting latch 52 and the second lower mounting latch 54.

Figure 4:
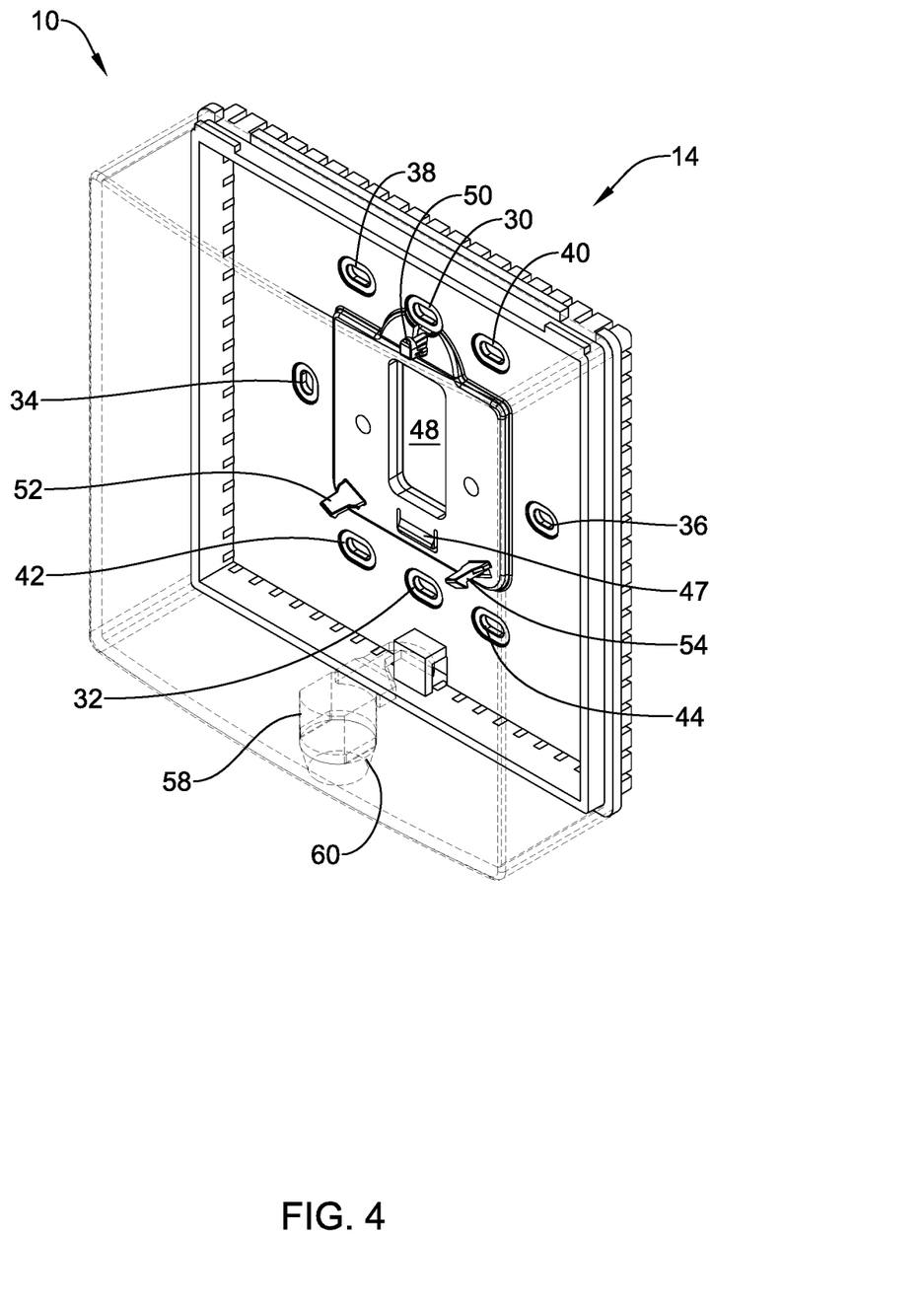
FIG. 4 is a perspective view of the illustrative lock box of FIG. 1, with the front cover shown in phantom to illustrate how the front cover is hingedly secured to the back plate as well as a locking mechanism releasably securing the front cover to the back plate in accordance with an example of the disclosure.

The illustrative back plate 14 includes a latch 56 that serves to releasably secure a locking mechanism that enables the front cover 12 to be selectively locked in a closed position or unlocked for removal of the front cover 12. As can be seen in FIG. 4, which shows the front cover 12 in phantom, a locking mechanism 58 may extend through an aperture 60 formed in a lower surface of the front cover 12 (best seen in FIG. 5) and can be rotated into (as shown) engagement with the latch 56 in order to secure the front cover 12 relative to the back plate 14, or can be rotated in an opposite direction (not shown) out of engagement with the latch 56 in order to free the front cover 12 relative to the back plate 14. In some cases, for example, the locking mechanism 58 may include a threaded nut or other feature that secures the locking mechanism 58 relative to the aperture 60 and thus relative to the front cover 12.

Figure 5:
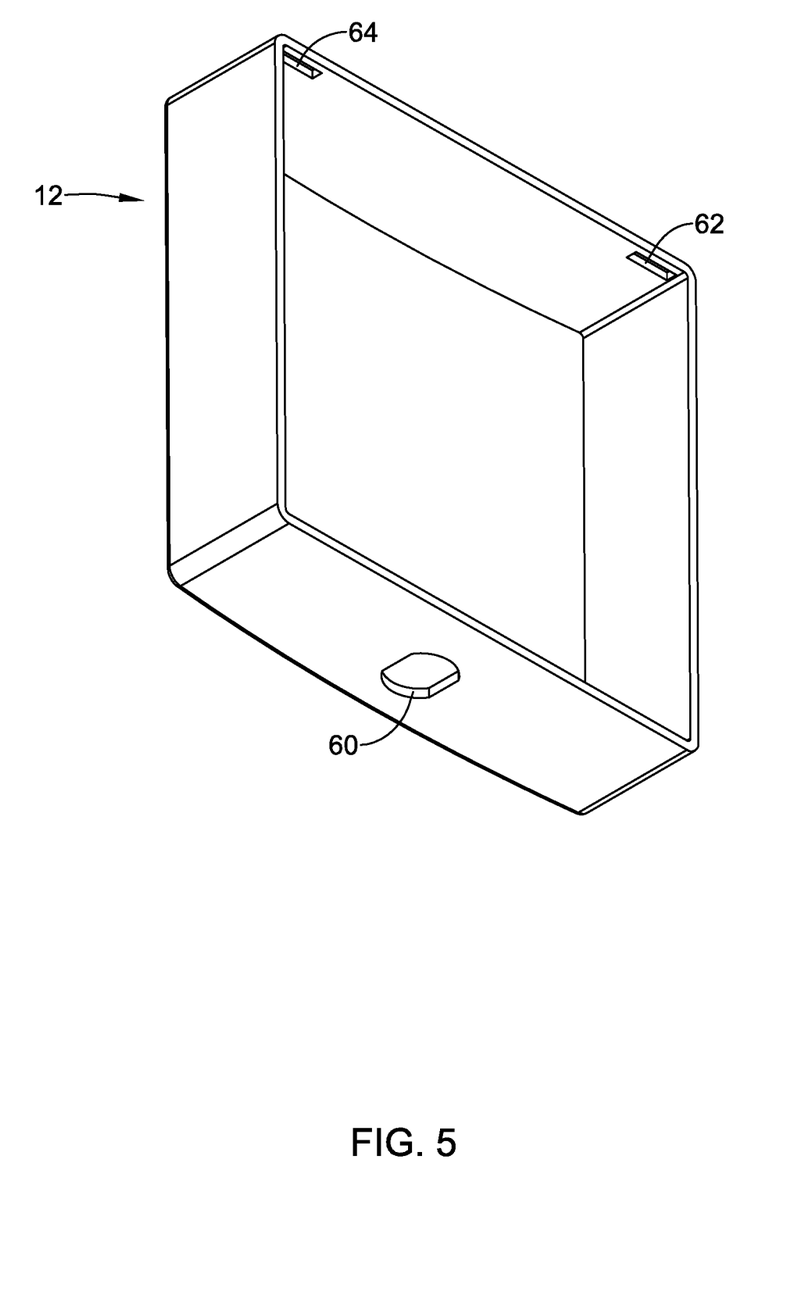
FIG. 5 is a reverse perspective view of the front cover forming part of the illustrative lock box of FIG. 1, shown from the rear of the front cover in accordance with an example of the disclosure.

FIG. 5 is a rear perspective view of the front cover 12. The front cover 12 may include a slot 62 that is configured to accommodate the tab 22 (FIG. 2) and a slot 64 that is configured to accommodate the tab 24. It will be appreciated that the front cover 12 may be secured to the back plate 14 by engaging the tab 22 within the slot 62 and engaging the tab 24 within the slot 64, and then rotating the front cover 12 downward into contact with the front cover engaging surface 20 (FIG. 2). If desire, the front cover 12 may then be locked to the back plate 14 by engaging the locking mechanism 58.

Figure 6:
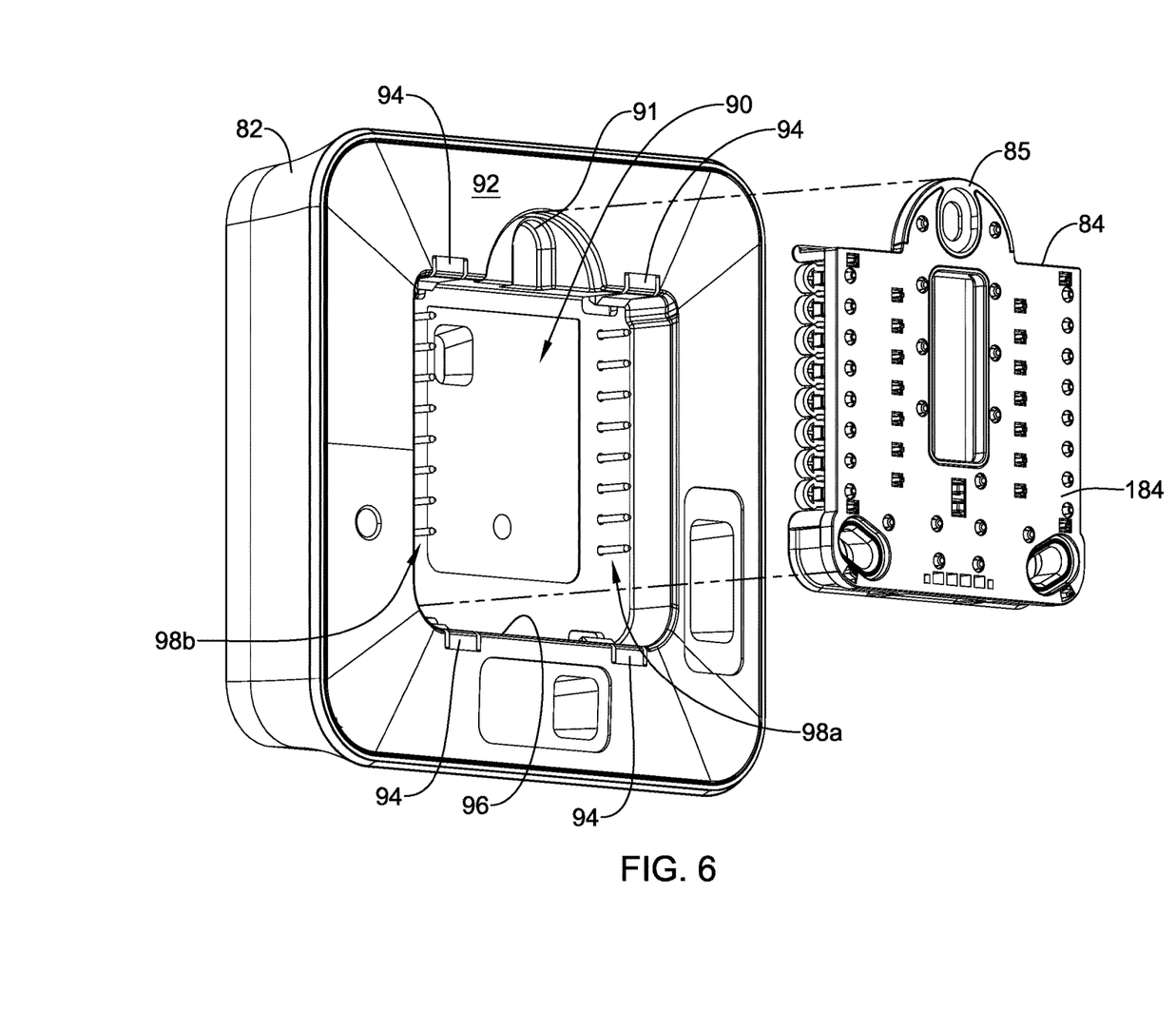
FIG. 6 is a rear exploded perspective view of a building controller and a wall mountable connector in accordance with an example of the disclosure.
Figure 7:
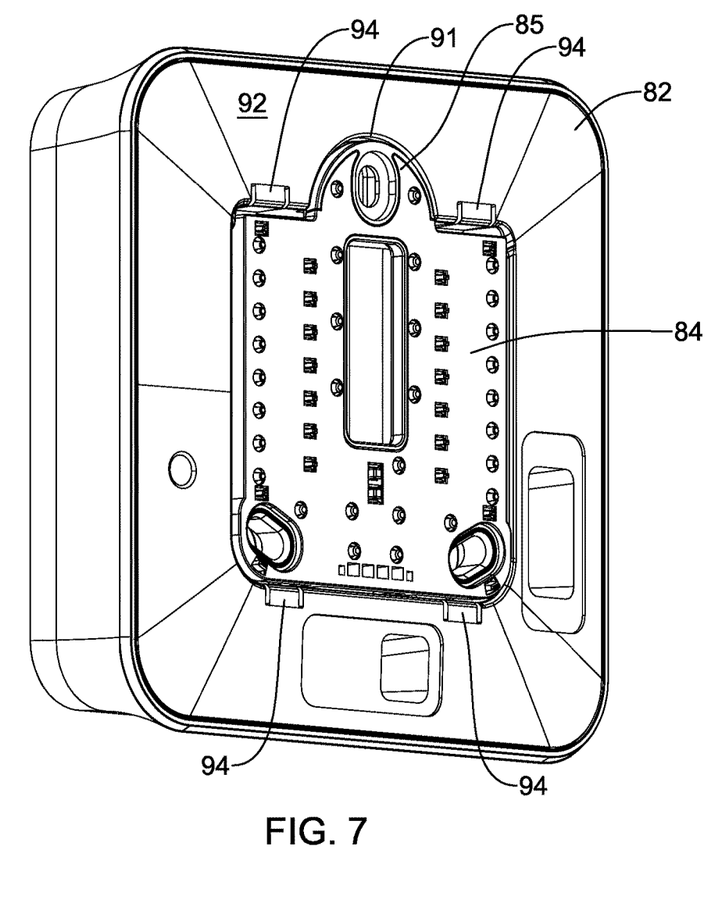
FIG. 7 is a rear view of the building controller and wall mountable connector of FIG. 6, showing the wall mountable connector nestled within the building controller.
Figure 8:
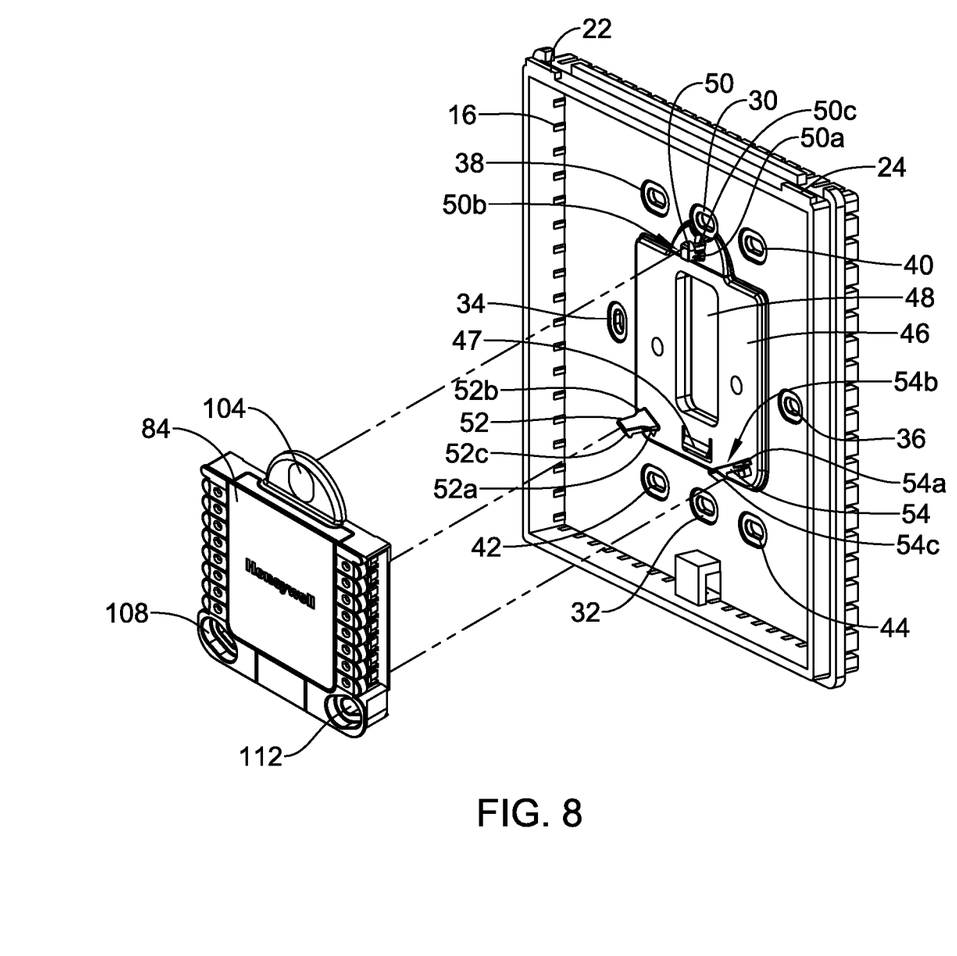
FIG. 8 is an exploded perspective view of a wall mountable connector and a back plate of the illustrative lock box of FIG. 1 in accordance with an example of the disclosure.
Figure 9:
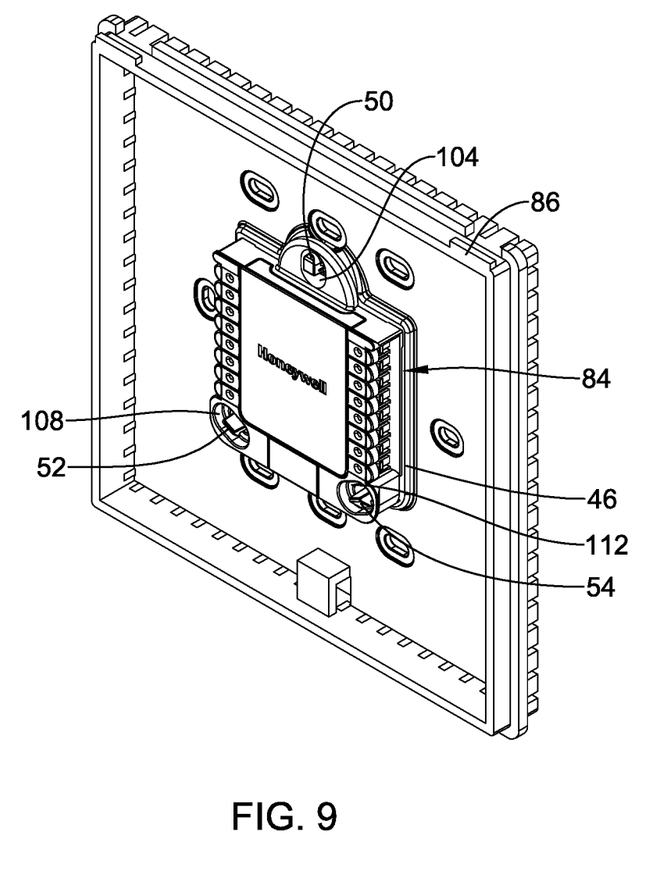
FIG. 9 is a perspective view of the wall mountable connector and back plate of FIG. 8, showing the wall mountable connector secured relative to the back plate of FIG. 8 in accordance with an example of the disclosure.

FIGS. 6 and 7 provide some details of the interaction between an illustrative building controller 82 and an illustrative wall mountable connector 84. FIGS. 8 and 9 provide some details of the interaction between the illustrative wall mountable connector 84 and the illustrative back plate 14 of the lock box 10. Referring to FIG. 6, which is an exploded perspective view of the illustrative wall mountable connector 84 positioned behind the illustrative building controller 82 (or showing the building controller 82 in front of the wall mountable connector 84). FIG. 7 shows the illustrative wall mountable connector 84 nestled into a recess 90 in the back of the illustrative building controller 82. In this example, the wall mountable connector 84 is sized and configured to fit within recess 90 that is formed within a back side 92 of the building controller 82. In some cases, the wall mountable connector 84 may include a mounting tab 85 extending upward from the wall mountable connector 84, and the recess 90 may include a corresponding recessed portion 91 to accommodate the mounting tab 85. FIG. 7 shows the wall mountable connector 84 positioned and secured within the recess 90. In some cases, at least 90 percent of the volume of the wall mountable connector 84 fits within the recess 90. In some cases, at least 95 percent of the volume of the wall mountable connector 84 fits within the recess 90. In some cases, at least 98 percent of the volume of the wall mountable connector 84 fits within the recess 90. In some cases, 100 percent of the volume of the wall mountable connector 84 fits within the recess 90.

In some cases, the building controller 82 may include one or more latches 94 that are each disposed within a side wall 96 of the recess 90. As illustrated, there are a pair of latches 94 disposed along an upper side of the recess 90 and a pair of latches 94 that are disposed along a lower side of the recess 90. In some cases, there may be fewer than a total of four latches 94. In some cases, there may be more than four latches 94. In some cases, at least some of the latches 94 may be disposed along one or both sides of the recess 90. Regardless of how many latches 94 are included, it will be appreciated that the latches 94 may help secure the building controller 82 to the wall mountable connector 84. The building controller 82 may also be mechanically secured to the wall mountable connector 84, in part, via interactions between a plurality of electrical pins 98 extending into the recess 90 and corresponding pin terminals formed within the wall mountable connector 84.

FIGS. 8 and 9 provide details of the interaction between the illustrative wall mountable connector 84 and the illustrative back plate 14. FIG. 8 is an exploded perspective view showing the illustrative wall mountable connector 84 disposed above or in front of the illustrative back plate 14, while FIG. 9 shows the illustrative wall mountable connector 84 secured against the front of the illustrative back plate 14. In some cases, the upper mounting latch 50 is configured to engage a corresponding upper mounting feature formed in the mounting tab 85 of the illustrative wall mountable connector 84 such as an upper mounting aperture 104. In the example shown, the first lower mounting latch 106 is configured to engage a corresponding first lower mounting feature such as a first lower mounting aperture 108 formed in the wall mountable connector 84. Similarly, the second lower mounting latch 110 is configured to engage a corresponding second lower mounting feature such as a second lower mounting aperture 112 formed in the wall mountable connector 84.

In some cases, the mounting latch 50, for example, may include a first crush rib 50*a* and a second crush rib 50*b* that fit into a corresponding mounting aperture 104 in the wall mountable connector 84. The first crush rib 50*aa* and the second crush rib 50*b*, in combination, span a distance across the mounting aperture 104 and in some cases at least partially compress or otherwise deform when the wall mountable connector 84 is mounted to the back plate 14 in order to reduce or eliminate slop or movement of the wall mountable connector 84 relative to the back plate 14 in the X direction. The illustrative mounting latch 50 also includes a latch portion 50*c* that is configured to engage a front surface of the wall mountable connector 84. Also, the mounting latch 52 may include a first crush rib 52*a* and a second crush rib 52*b* that fit into a corresponding mounting aperture 108 in the wall mountable connector 84, and a latch portion 52*c* that is configured to engage a front surface of the wall mountable connector 84. Likewise, the mounting latch 54 may include a first crush rib 54*a* and a second crush rib 54*b* that fit into a corresponding mounting aperture 112 in the wall mountable connector 84, and a latch portion 54*c* that is configured to engage a front surface of the wall mountable connector 84.

Figure 10:
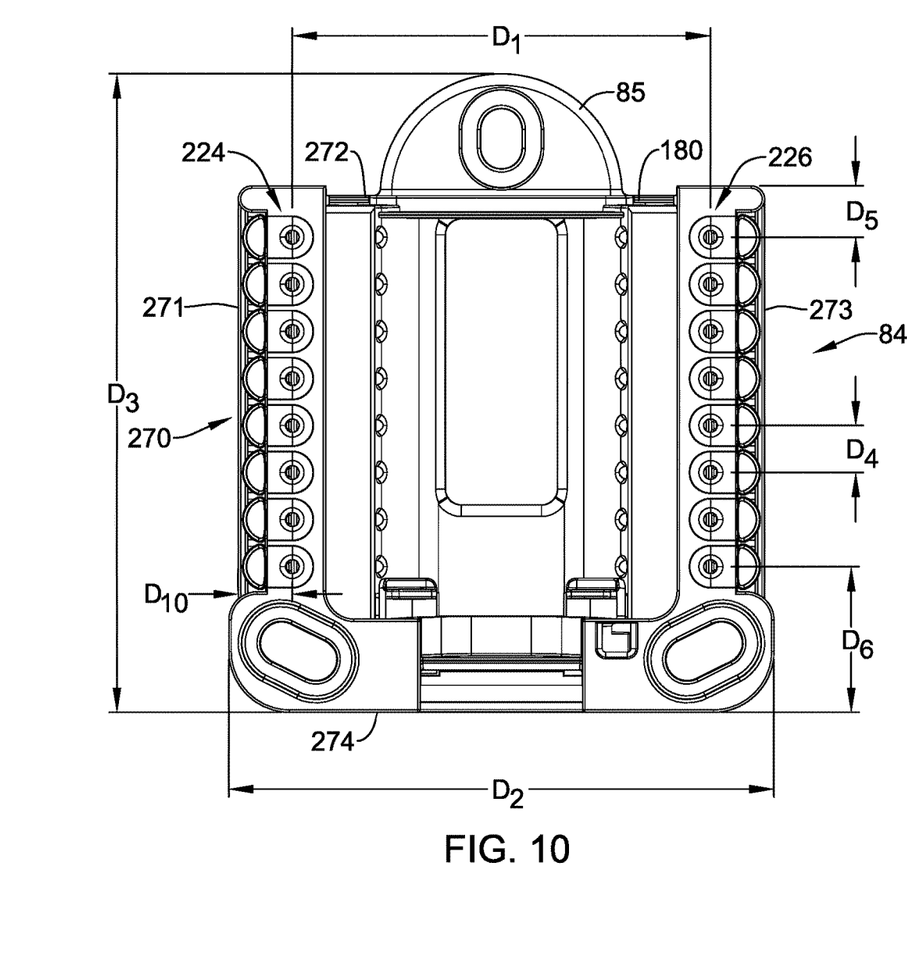
FIG. 10 is a front view of a wall mountable connector, with particular dimensions annotated.

FIG. 10 is a front view of an illustrative wall mountable connector 84, annotated to define several dimensions. In some cases, as illustrated, a first column of pin terminals 224 may be at least substantially parallel with a second column of pin terminals 226. In this, substantially parallel may be defined as being within about plus or minus 10 degrees from a geometric parallel. In some cases, the first column of pin terminals 224 and the second column of pin terminals 226 may be configured to accommodate a corresponding first column of pins and a second column of pins extending backward from the back of a building controller such that the first column of pins and the second column of pins may extend into the first column of pin terminals 224 and the second column of pin terminals 226 in order to provide electrical connections between the building controller and the wall mountable connector 84.

In some cases, the first column of pin terminals 224 is spaced a distance labeled $D_1$ from the second column of pin terminals 226. In some instances, $D_1$ may range from 30 millimeters (mm) to 60 mm. In some instances, $D_1$ may range from 40 mm to 50 mm. In some instances, $D_1$ may be about 44.5 mm, where "about" refers to plus or minus ten percent. The wall mountable connector 84 may have an overall width that is labeled as $D_2$ and an overall height that is labeled as $D_3$. In some instances, $D_2$ may be less than about 80 mm, or less than about 70 mm, or less than about 60 mm. In some cases, $D_3$ may be less than about 80 mm, or less than about 70 mm. In some cases, there may be a spacing labeled $D_4$ between adjacent pins. $D_4$ may be about 15 mm or less, 10 mm or less, 5 mm or less, or another suitable dimension. In some cases, the spacing between adjacent pins labeled $D_4$ may be about 5 mm. It will be appreciated that a building controller made to be secured to the wall mountable connector 84, may have inter-pin and inter-pin column spacing that corresponds to that of the wall mountable connector 84.

In some cases, the first column of pin terminals 224 may be parallel with and vertically aligned with the second column of pin terminals 226. In some cases, the first column of pin terminals 224 and the second column of pin terminals 226 may be vertically asymmetric, meaning that they are not vertically centered on the wall mountable connector 84, but instead are disposed closer to a top 272 of the housing 180 than they are to a bottom 274 of the housing 180. In some cases, a top pin terminal 224, 226 may be spaced from the top 272 a distance that is labeled as $D_5$ while a bottom pin terminal 224, 226 may be spaced from the bottom 274 a distance that is labeled as $D_6$. $D_6$ may be larger than $D_5$. In some cases, $D_5$ may be less than about 8 mm. $D_5$ may be between about 4.5 mm and about 6.5 mm. $D_6$ may be about 18 mm or less. In some cases, $D_6$ may be between about 14.5 mm and about 16.5 mm.

In some cases, it may be useful to describe the position of the pin terminals 224 and 226 relative to an outer edge of the wall mountable connector 84. With reference to FIG. 10, the wall mountable connector 84 may be considered as having a left edge 271 and a right edge 273. In some cases, the pin terminals 224 may be spaced from the left edge 271 a distance that is labeled as $D_9$. It will be appreciated that the pin terminals 226 may be spaced from the right edge 273 a distance equal to $D_9$. In some cases, $D_9$ may be between about 3 mm and about 20 mm. $D_9$ may be between about 4 mm and about 12 mm. $D_9$ may be between about 5 mm and about 8 mm. In some cases, $D_9$ may be about 6 mm.

Figure 11:
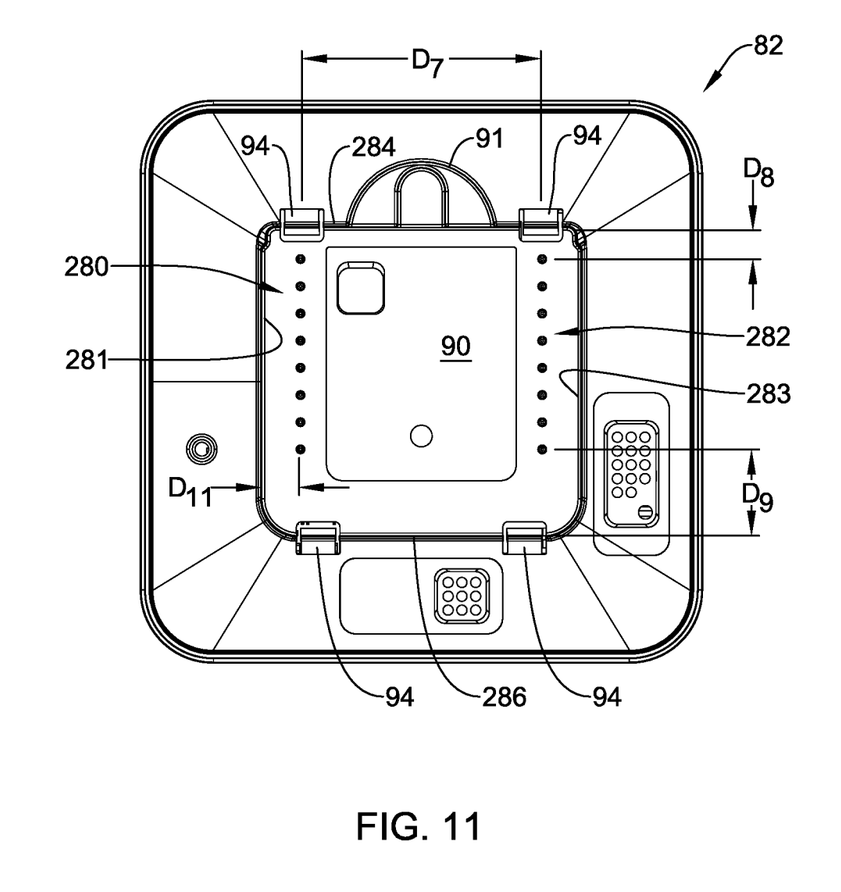
FIG. 11 is a back view of a building controller usable with the wall mountable connector of FIG. 10, with particular dimensions annotated.

FIG. 11 is a back plan view of an illustrative building controller 82 usable with the illustrative wall mountable connector 84 of FIG. 10, with particular dimensions annotated. For example, $D_7$, which indicates a spacing between a first column of pins 280 and a second column of pins 282 may be about the same as the $D_1$ spacing shown on FIG. 23. Similarly, $D_8$, which indicates a spacing between an uppermost pin 280 or 282 and a top edge 284 of the recess 90, may be about the same as the $D_5$ spacing shown on FIG. 23. $D_9$, which indicates a spacing between a lowermost pin 280 or 282 and a bottom edge 286 of the recess 90, may be about the same as the $D_6$ spacing shown on FIG. 23. $D_7$ may range from 30 mm to 60 mm. In some instances, $D_7$ may range from 40 mm to 50 mm. In some instances, $D_7$ may be about 44.5 mm. $D_8$ may be less than about 8 mm. $D_8$ may be between about 4.5 mm and about 6.5 mm. $D_9$ may be about 18 mm or less. In some cases, $D_9$ may be between about 14.5 mm and about 16.5 mm.

In some cases, it may be useful to describe the position of the first column of pins 280 and the second column of pins 282 relative to an outer edge of the recess 90 formed in the building controller 82. With reference to FIG. 24, the recess 90 may be considered as having a left edge 281 and a right edge 283. In some cases, the first column of pins 280 may be spaced from the left edge 281 a distance that is labeled as $D_{10}$. It will be appreciated that the second column of pins 282 may be spaced from the right edge 283 a distance equal to $D_{10}$. In some cases, $D_{10}$ may be between about 3 mm and about 20 mm. $D_{10}$ may be between about 4 mm and about 12 mm. $D_{10}$ may be between about 5 mm and about 8 mm. In some cases, $D_{10}$ may be about 6 mm.

The first column of pins 280 in FIG. 11 may be substantially parallel with the second column of pins 282. In some cases, the first column of pins 280 may be substantially vertically aligned with the second column of pins 282. As illustrated, the first column of pins 280 and the second column of pins 282 may be vertically closer to the top edge 284 of the recess 90 than to the bottom edge 286. Accordingly, and in comparison with FIG. 10, it will be appreciated that the building controller 82 will only fit onto the wall mountable connector 84 in a single orientation. One can't accidently mount the building controller 82 upside down or sideways, for example. It is contemplated that these mechanical alignment and fitment features may be carried out through a line of compatible building controllers.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A lock box for protecting a building controller from tampering, the lock box comprising:
   a back plate;
   one or more mounting features defined by the back plate, the one or more mounting features configured to permit a wall mountable connector to be secured to the back plate by pressing the wall mountable connector against the back plate such that the one or more mounting features of the back plate engage corresponding mounting features of the wall mountable connector, wherein the wall mountable connector is configured to releasably secure a building controller to the wall mountable connector, and thus to the back plate, and to provide electrical connections between the building controller and equipment that is to be controlled by the building controller;
   a plurality of mounting apertures defined by the back plate, each of the plurality of mounting apertures configured to receive a securement for securing the back plate to a wall;
   a front cover hingedly coupled to the back plate, the front cover movable between an open position in which a user may access the building controller when the building controller and the wall mountable connector are secured relative to the back plate, and a closed position in which the user is prevented from accessing the building controller when the building controller and the wall mountable connector are secured relative to the back plate; and
   a lock configured to selectively lock the front cover in the closed position.

2. The lock box of claim 1, wherein the one or more mounting features of the back plate comprises:
   an upper mounting latch;
   a first lower mounting latch located lower than the upper mounting latch and offset to the left of the upper mounting latch;
   a second lower mounting latch located lower than the upper mounting latch and offset to the right of the upper mounting latch; and
   wherein the wall mountable connector comprises three mounting features positioned to engage the upper mounting latch, the first lower mounting latch and the second lower mounting latch, respectively.

3. The lock box of claim 1, wherein at least one of the mounting features of the back plate includes a pair of crush ribs, and a latch that extends through a hole in the wall mountable connector when the wall mountable connector are secured relative to the back plate.

4. The lock box of claim 3, wherein the pair of crush ribs are configured to deform as they are pressed at least partially into the hole in the wall mountable connector.

5. The lock box of claim 1, wherein the plurality of mounting apertures defined by the back plate comprise at least two mounting apertures that are configured to mount the back plate to a single junction box situated in a vertical orientation.

6. The lock box of claim 1, wherein the plurality of mounting apertures defined by the back plate comprise at least two mounting apertures that are configured to mount the back plate to a single junction box situated in a horizontal orientation.

7. The lock box of claim 1, wherein the plurality of mounting apertures defined by the back plate comprise at least two mounting apertures that are configured to mount the back plate to a double junction box.

8. The lock box of claim 1, wherein:
   the back plate further comprises one or more tabs disposed along an upper surface of the back plate; and
   the front cover includes a slot that fits over the one or more tabs in order to hingedly couple the front cover to the back plate.

9. The lock box of claim 1, wherein the back plate further comprises a raised portion having a profile corresponding to that of the wall mountable connector, and the one or more mounting features defined by the back plate extending forward from the raised portion.

10. The lock box of claim 9, wherein the raised portion comprises a field wire opening that permits one or more field wires to pass from the wall, through the back plate and to the wall mountable connector when the wall mountable connector are secured relative to the back plate.

11. The lock box of claim 9, wherein the plurality of mounting apertures defined by the back plate are outside of the raised portion.

12. The lock box of claim 1, wherein the building controller comprises a thermostat.

13. A lock box for protecting a thermostat, the lock box comprising:
   a back plate;
   a field wire aperture defined within and extending through the back plate;
   one or more latching features for latching a wall mountable connector to the back plate, wherein the wall mountable connector is configured to releasably secure a thermostat to the wall mountable connector; and
   a front cover operatively coupled to the back plate and movable between an open position in which a user may access the thermostat when the wall mountable connector and the thermostat are secured relative to back plate, and a closed position in which the user is prevented from accessing the thermostat when the wall mountable connector and the thermostat are secured relative to the back plate.

14. The lock box of claim 13, wherein the one or more latching features comprise:
   a first mounting latch offset horizontally to the left of a left side of the field wire aperture;
   a second mounting latch offset horizontally to the right of a right side of the field wire aperture; and a third mounting latch offset vertically from the first mounting latch and/or the second mounting latch.

15. The lock box of claim 13, further comprising a lock configured to releasably secure the front cover to the back plate when the front cover is in the closed position.

16. The lock box of claim 13, further comprising a plurality of mounting apertures defined by the back plate, each of the plurality of mounting apertures configured to receive a securement for securing the back plate to a wall.

17. The lock box of claim 16, wherein at least some of the plurality of mounting apertures are configured to mount the back plate to a junction box disposed within the wall.

18. The lock box of claim 13, wherein the one or more latching features comprise a first mounting latch, a second mounting latch and a third mounting latch, wherein the first mounting latch, the second mounting latch and the third mounting latch are configured, in combination, to engage corresponding mounting openings of the wall mountable connector to secure the wall mountable connector relative to back plate.

19. The lock box of claim 18, wherein the first mounting latch is offset horizontally to the left of a left side of the field wire aperture by no more than 1.5 inches and the second mounting latch is offset horizontally to the right of a right side of the field wire aperture by no more than 1.5 inches.

20. A lock box for protecting a thermostat, the lock box comprising:
   a back plate;
   a field wire aperture defined within and extending through the back plate;
   an interference connector defined by the back plate for forming an interference connection with a wall mountable connector, wherein the wall mountable connector is configured to releasably secure a thermostat to the wall mountable connector; and
   a front cover operatively coupled to the back plate and movable between an open position in which a user may access the thermostat when the wall mountable connector and the thermostat are secured relative to back plate, and a closed position in which the user is prevented from accessing the thermostat when the wall mountable connector and the thermostat are secured relative to the back plate.

\* \* \* \* \*